(12) United States Patent
George

(10) Patent No.: US 9,097,362 B2
(45) Date of Patent: Aug. 4, 2015

(54) FAST SWITCHING HYDRAULIC PILOT VALVE WITH HYDRAULIC FEEDBACK

(71) Applicant: Parker-Hannifin Corporation, Cleveland, OH (US)

(72) Inventor: Hal E. George, Rocky River, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 179 days.

(21) Appl. No.: 13/778,998

(22) Filed: Feb. 27, 2013

(65) Prior Publication Data

US 2013/0220453 A1 Aug. 29, 2013

Related U.S. Application Data

(60) Provisional application No. 61/603,507, filed on Feb. 27, 2012.

(51) Int. Cl.
*F16K 11/07* (2006.01)
*F16K 31/122* (2006.01)
*F16K 31/06* (2006.01)

(52) U.S. Cl.
CPC ............ *F16K 31/122* (2013.01); *F16K 31/0613* (2013.01); *F16K 31/0686* (2013.01); *Y10T 137/7762* (2015.04)

(58) Field of Classification Search
CPC .............. F16K 31/122; F16K 31/0386; F16K 31/0613; Y10T 137/7762
USPC ............. 137/625.25, 625.67, 625.68, 625.65, 137/625.66
See application file for complete search history.

(56) References Cited

U.S. PATENT DOCUMENTS

| | | | | |
|---|---|---|---|---|
| 1,765,090 A | * | 6/1930 | Morin | 137/625.69 |
| 2,263,421 A | * | 11/1941 | Harrington | 137/596.2 |
| 3,238,966 A | * | 3/1966 | Howard et al. | 137/488 |
| 3,805,837 A | * | 4/1974 | Stampfli | 137/625.6 |
| 3,921,660 A | * | 11/1975 | Kowalski | 137/236.1 |
| 4,510,848 A | * | 4/1985 | Kast | 91/461 |
| 5,051,631 A | * | 9/1991 | Anderson | 310/14 |
| 5,117,869 A | * | 6/1992 | Kolchinsky | 137/625.65 |
| 5,186,093 A | * | 2/1993 | Kervagoret | 91/433 |
| 5,918,635 A | * | 7/1999 | Wang et al. | 137/625.65 |
| 6,092,784 A | * | 7/2000 | Kalfsbeck | 251/129.15 |
| 6,148,856 A | * | 11/2000 | Kropp | 137/596 |
| 6,216,457 B1 | | 4/2001 | Lubbers et al. | |
| 6,578,606 B2 | * | 6/2003 | Neuhaus et al. | 137/625.65 |
| 6,681,806 B2 | * | 1/2004 | Isobe | 137/625.65 |
| 6,772,791 B2 | * | 8/2004 | Neff | 137/625.65 |
| 7,121,187 B2 | | 10/2006 | Holder | |
| 8,006,718 B2 | * | 8/2011 | Hamaoka et al. | 137/625.65 |

(Continued)

*Primary Examiner* — Marina Tietjen
*Assistant Examiner* — Umashankar Venkatesan
(74) *Attorney, Agent, or Firm* — Renner, Otto, Boisselle & Sklar, LLP

(57) ABSTRACT

Provided is a fast switching hydraulic pilot valve with hydraulic feedback for quickly and accurately switching between opened and closed positions of the hydraulic valve. The hydraulic valve includes a valve body, a valve bore defined by the valve body, a plurality of valve ports extending through the valve body and into the valve bore, and an actuator. Actuation of the actuator allows for movement of the spool to a first position within the valve bore, thereby providing for one of opening or closing the hydraulic valve. Exposure of the spool to a pressure at an end of the spool proximate the actuator allows for movement of the spool to a second position within the valve bore, thereby providing for the other of opening or closing the hydraulic valve.

19 Claims, 8 Drawing Sheets

(56) References Cited

U.S. PATENT DOCUMENTS

| | | | |
|---|---|---|---|
| 8,006,719 B2* | 8/2011 | Nordstrom et al. | 137/625.68 |
| 8,397,759 B2* | 3/2013 | Oikawa et al. | 137/625.68 |
| 2008/0258090 A1* | 10/2008 | Najmolhoda et al. | 251/129.15 |
| 2011/0132473 A1 | 6/2011 | Rinaldi | |
| 2013/0207012 A1* | 8/2013 | Williams et al. | 251/129.07 |

* cited by examiner

FAST SWITCHING HYDRAULIC PILOT VALVE WITH HYDRAULIC FEEDBACK

RELATED APPLICATIONS

This application claims the benefit of U.S. Provisional Application No. 61/603,507 filed Feb. 27, 2012, which is hereby incorporated herein by reference.

FIELD OF INVENTION

The present invention relates generally to a hydraulic valve, and more particularly to a fast switching hydraulic pilot valve with pressure feedback.

BACKGROUND

Hydraulic systems are employed in many circumstances to provide hydraulic power from a hydraulic power source to multiple loads. In particular, such hydraulic systems are commonly employed in a variety of work vehicles such as utility trucks and loader-backhoes. In such vehicles, the loads powered by the hydraulic systems may include a variety of hydraulically actuated devices, such as piston-cylinder assemblies for lowering, raising, and rotating arms and for lowering and raising buckets, as well as hydraulically-powered motors for driving tracks or wheels of vehicles. Although the various hydraulically actuated devices may be powered by a single source (e.g., a single pump), the rates of fluid flow to the different devices can be independently controllable, through the use of separate control valves (typically spool valves or pilot valves) that are independently controlled by an operator of the work vehicle or a control system. In such hydraulic system applications, the control valves may be used as components in a valve bank including many such control valves as well as other valves, where the control valves may control the other valves, such as slave valves.

The operation of the hydraulically actuated devices depends upon hydraulic fluid flow to those devices, which in turn may depend upon the operation of the control valves, such as pilot valves, controlling the hydraulic fluid flow between various ports of the control valves. More particularly, hydraulic fluid flow to those devices may depend upon the functionality of control valves to quickly and accurately switch between positions of the control valves restricting and allowing fluid flow between a pressure source and the hydraulically actuated devices.

SUMMARY OF INVENTION

The present invention provides a fast switching hydraulic pilot valve with hydraulic feedback for quickly and accurately switching between opened and closed positions of the hydraulic valve. The hydraulic valve includes a valve body, a valve bore defined by the valve body, a plurality of valve ports extending through the valve body and into the valve bore, and an actuator. Actuation of the actuator allows for movement of the spool to a first position within the valve bore, thereby providing for one of opening or closing the hydraulic valve. Exposure of the spool to a pressure at an end of the spool proximate the actuator allows for movement of the spool to a second position within the valve bore, thereby providing for the other of opening or closing the hydraulic valve.

According to one aspect of the invention, a hydraulic valve includes a valve body defining an inner valve bore and a plurality of valve ports in selective fluidic communication with the valve bore. The hydraulic valve also includes a spool received in the valve bore and moveable between first and second positions for controlling fluidic communication between the valve bore and the plurality of valve ports. The hydraulic valve also includes an actuator configured to move the spool to the first position within the valve body when the actuator is actuated, wherein the first position allows fluidic communication between a first valve port of the plurality of valve ports and a second valve port of the plurality of valve ports while restricting fluidic communication between the first valve port and a third valve port of the plurality of valve ports. The hydraulic valve further includes a chamber disposed at an end of the spool proximate the actuator, a pressure of the chamber causing bias of the spool in a direction of the second position, wherein the second position of the spool restricts fluidic communication between the first and second valve ports while allowing fluidic communication between the first and third valve ports.

The chamber of the hydraulic valve may be in continuous fluidic communication with the first valve port, thereby biasing the spool in a direction of the second position when exposed to a control pressure at the first valve port.

The spool of the hydraulic valve may include a spool body defining a spool bore, the spool bore defining a first cavity portion disposed at the end of the spool proximate the actuator, the first cavity portion in continuous fluidic communication with the chamber and with the first valve port.

The spool of the hydraulic valve may include a spool port extending through the spool body, the spool port providing for the continuous fluidic communication between the first cavity portion and the first valve port.

The spool of the hydraulic valve may include a spool body defining a spool bore, the spool bore including first and second cavity portions, the second cavity portion for establishing fluidic communication with a control pressure of the first valve port and a tank pressure of the third valve port.

The first cavity portion of the hydraulic valve may be in continuous fluidic communication with the chamber, the first cavity portion for establishing fluidic communication with a control pressure of the first valve port, a supply pressure of a second valve port, and a tank pressure of the third valve port.

The spool of the hydraulic valve may be biased in a direction of the second position when exposed to a pressure differential acting across the spool between the first and second cavity portions.

The hydraulic valve may further include a flow path disposed in the valve body, the flow path for establishing fluidic communication with the chamber, and the flow path fluidically separated from the first, second, and third valve ports.

The hydraulic valve may further include a spring for biasing the spool in a direction of the second position.

A failure of the spring of the hydraulic valve may not cause the spool to be biased in a direction of the first position.

The actuator of the hydraulic valve may be a solenoid, and the solenoid may be controlled via a pulse width modulated (PWM) closed loop current drive or a pulse width modulated (PWM) voltage drive.

According to another aspect of the invention, a hydraulic valve includes an actuator, a valve body including a valve bore and a plurality of pressure ports extending through the valve body to the valve bore, and a spool receivable in the valve bore and moveable between first and second positions, the first position permitting communication between a supply pressure port of the plurality of pressure ports and a control pressure port of the plurality of pressure ports, the second position restricting communication between the supply pressure port and the control pressure port. The spool includes an interior passageway for defining first and second chambers, the first chamber for establishing continuous communication with a tank pressure port of the plurality of pressure ports, and the second chamber for establishing continuous communication between the control pressure port and a third chamber, the third chamber disposed between the actuator and an end of the spool opposite the first chamber, wherein actuation of the actuator causes the spool to move in a direction of the first position, and wherein exposure of the third chamber to a control pressure at the control pressure port causes the spool to be biased in a direction of the second position.

The first position of the spool may restrict communication between the control pressure port and the tank pressure port, wherein the second position of the spool may allow communication between the control pressure port and the tank pressure port.

The hydraulic valve may further include a spring disposed between the actuator and the end of the spool opposite the first chamber, the spring for biasing the spool in a direction of the second position.

A failure of the spring may not cause the spool to be biased in a direction of the first position.

A pressure differential acting across the spool between the first and second chambers may cause the spool to be biased in a direction of the second position.

The actuator of the hydraulic valve may be a solenoid, and the solenoid may be controlled via a pulse width modulated (PWM) closed loop current drive or a pulse width modulated (PWM) voltage drive.

The spring may maintain bias of the spool in a direction of the second position upon vertical alignment of the hydraulic valve between the first and second chambers.

According to yet another aspect of the invention, a hydraulic valve includes a valve body defining a valve bore extending therein between a first valve end and a second valve end opposite the first valve end, the valve body further defining a plurality of valve ports extending through the valve body and in fluidic communication with the valve bore, wherein a first valve port of the plurality of valve ports is disposed at the first valve end. The hydraulic valve also includes a spool received within and moveable within the valve bore, the spool including a spool body defining first and second spool cavities, the first spool cavity extending therein between a first spool end and an internal wall portion of the spool body, and the second spool cavity extending therein between the internal wall portion and a second spool end opposite the first spool end, wherein the first spool cavity is in continuous fluidic communication with the first valve port, and wherein the second spool cavity is in continuous fluidic communication with one of the second or third valve ports. The hydraulic valve further includes an actuator disposed proximate a portion of the second spool end of the spool, the actuator for moving the spool within the valve bore thereby controlling fluidic communication amongst the first, second, and third valve ports of the plurality of valve ports when the actuator is actuated. Fluidic communication amongst the first, second, and third valve ports when the actuator is not actuated is controlled by a pressure differential acting across the spool between the first and second spool cavities, the pressure differential caused by exposure of the first valve port to a first pressure and exposure of the one of the second or third valve ports to a second pressure greater than the first pressure.

The foregoing and other features of the invention are hereinafter described in greater detail with reference to the accompanying drawings.

DETAILED DESCRIPTION

The principles of the present application have general application to hydraulic valves, and particular application to a fast switching hydraulic pilot valve, and thus will be described below chiefly in this context. The fast switching hydraulic pilot valve may be used in hydraulic systems to control fluid flow to hydraulically actuate devices such as piston-cylinder assemblies. For example, the fast switching hydraulic pilot valve may be suitable for hydraulic systems in vehicles, such as piston-cylinder assemblies for moving arms, buckets, or lifts of utility trucks or loader-backhoes. It will of course be appreciated, and also understood, that the principles of the invention may be useful in other applications, in particular, in hydraulic systems not used in vehicles.

Figure 1A:
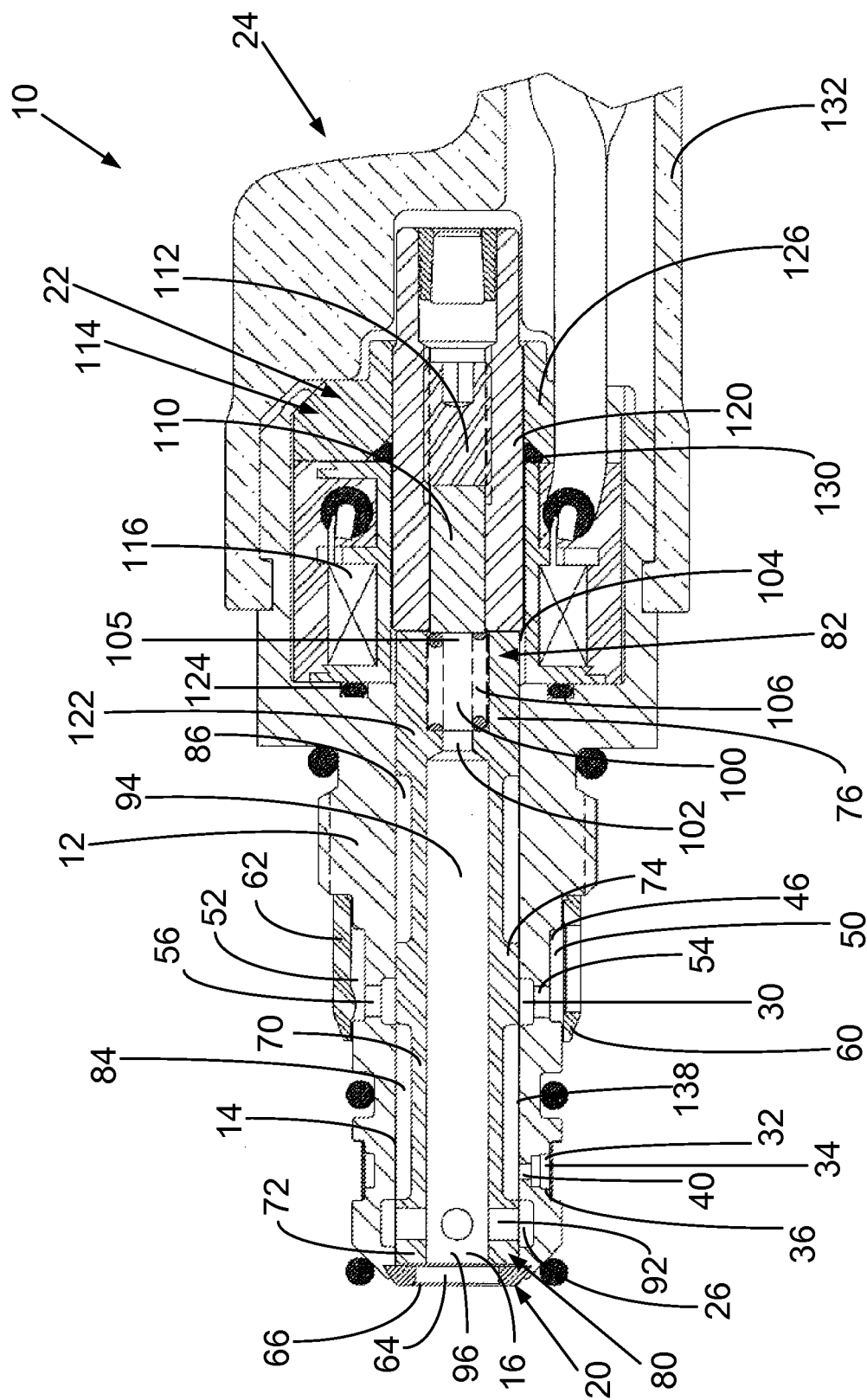
FIG. 1A is a partial cut-away view of a conventional pilot valve.
Figure 1B:
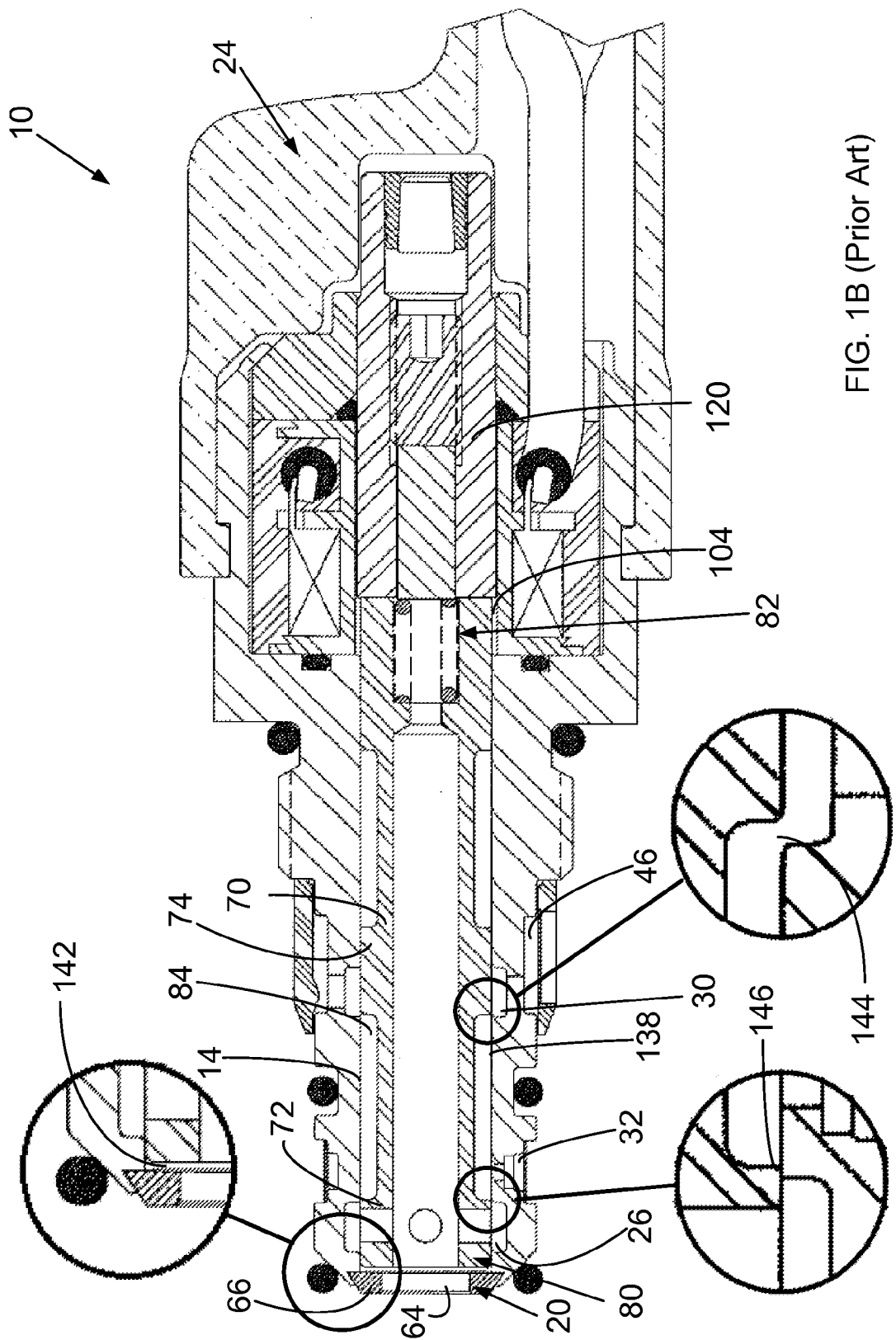
FIG. 1B is another partial cut-away view of the conventional pilot valve of FIG. 1A.
Figure 1C:
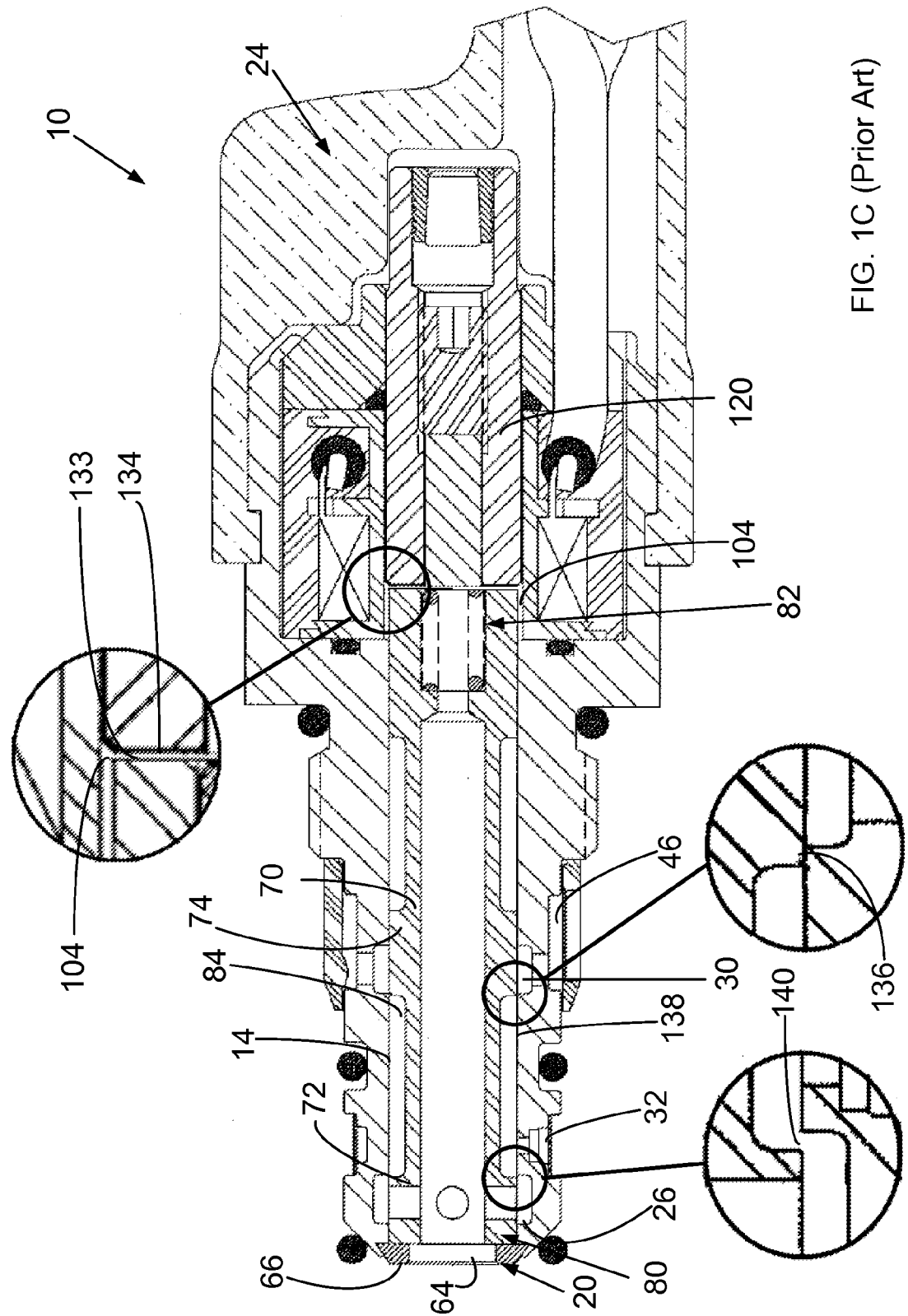
FIG. 1C is yet another partial cut-away view of the conventional pilot valve of FIG. 1A.

One such conventional pilot valve used in these applications is shown in detail in the drawings, and generally indicated in FIGS. 1A-1C at 10. The valve 10 includes a valve body 12 within which a bore 14 is defined. The valve body 12 may be made of steel such as stainless steel or any other suitable material. The valve bore 14 extends between a first opening 16 at a first valve end 20 and an actuator 22 disposed at the second valve end 24 of the valve body 12. As shown, the valve bore 14 may be located along a center axis of the valve body 12 and may be generally cylindrical in shape, but may also be located along an alternate axis of the valve body 12 and of any other suitable shape. Extending into an interior of the valve body 12 from within the bore 14 are first and second recesses 26 and 30. As shown, the first recess 26 is disposed proximate the first valve end 20, and the second recess 30 is disposed proximate the first recess 26. First and second recesses 26 and 30 may extend radially through the valve body 12 and may be generally cylindrical, although they may also extend other than radially and be of any other suitable shape.

A fluid outlet, such as a control pressure port 32, is disposed in the valve body 12 in a location interposed between the annular recesses 26 and 30. The control pressure port 32 extends through the valve body 12 between a control pressure port opening 34 and the valve bore 14. Although not specifically shown, one of ordinary skill will realize that the control pressure port 32 may extend through the valve body 12 between the opening 34 and a second opening disposed opposite the opening 34. A filter 36 may be coupled to the control pressure port opening 34 for filtering particulate from fluid, including liquid such as hydraulic fluid, gas, or a mixture thereof, flowing into the valve bore 14. The control pressure port 32 includes a fluid flow passage 40 disposed between the control port 32 and the valve bore 14.

A fluid inlet, such as a supply pressure port 46, is disposed in the valve body 12 generally at the location of the second recess 30. The supply pressure port 46 includes a first supply port opening 50 and a second supply port opening 52 disposed opposite the first supply port opening 50. Fluid flow passages 54 and 56 are disposed between the valve bore 14 and the first and second openings 50 and 52, respectively. Although not specifically shown, one of ordinary skill will realize that the supply pressure port 46 may include only one opening, such as opening 50 or opening 52. Filters 60 and 62 may be coupled to the first and second control pressure port openings 50 and 52, respectively, for filtering particulate from fluid flowing into the valve bore 14.

Another fluid port, such as a tank pressure port 64, is disposed at the first valve end 20 generally at the location of the first opening 16. A tank pressure port coupling 66 may provide for coupling between the valve body 12 and a tank pressure port line (not shown).

The valve bore 14 is adapted to receive a valve spool 70 that is moveable between first and second positions within the valve bore 14 for controlling selective fluidic communication, including fluid flow and associated fluid pressure, between the various ports 32, 46, and 64 of the valve 10. The spool 70 may be made of steel such as stainless steel or any other suitable material. As shown, the valve spool 70 is generally cylindrical, but may be of any other suitable shape. The spool 70 includes first, second, and third lands 72, 74, and 76, respectively, each of the lands extending generally circumferentially around the spool 72 for controlling fluidic communication between the various ports 32, 46, and 64. The first land 72 is disposed at a first spool end 80 adjacent the first valve end 20. The third land 76 is disposed at a second spool end 82 opposite the first spool end 80, and the second land 74 is interposed between the first and second spool ends 80 and 82.

First and second spool recessed portions 84 and 86 are interposed between the lands 72, 74, and 76, and extend generally circumferentially around the spool 70, although one of ordinary skill will realize that the recessed portions 84 and 86 may only extend partially circumferentially around the spool 70. The first recessed portion 84 is interposed between the first and second lands 72 and 74 and is positioned to correspond to the locations of the control pressure port 32 and the supply pressure port 46. The second recessed portion 86 is interposed between the second and third lands 74 and 76 and may provide for a reduced mass of the spool 70. A plurality of flow passages 92 extends in a radially inward direction through land 72 and terminates at a spool bore or spool passageway, such as an interior chamber 94 of the spool 70. The chamber 94 is in fluidic communication with the tank port 64 via a first spool opening 96 disposed at the first spool end 80 of the spool 70.

The chamber 94 is also in fluidic communication with a spring chamber 100 via a central orifice 102 extending between the spring chamber 100 and the chamber 94. The spring chamber 102 is disposed at the second end 82 of the spool 70 and opens to an interior valve chamber portion 104 of the valve bore 14 via a second spool opening 105. The chamber portion 104 is disposed between the second end 82 of the spool 70 and the actuator 22. A spring, such as a helical spring 106, is disposed in the spring chamber 100 for acting on the spool 70. The spring 106 may be a compression spring, magazine spring, or any other type of spring suitable for acting on the spool 70. As shown, the valve 10 may also include a pin 110 positioned by a set screw 112 for setting the compression of the spring 106. Although, one of ordinary skill will realize that the valve 10 may not include the pin 110 and set screw 112, and that the spring 106 may instead abut the actuator 22, for example.

As shown, the actuator 22 may be a solenoid 114, though one of ordinary skill will realize that the actuator may include a piston-cylinder assembly or other apparatus for moving the spool 70 within the valve bore 14. The solenoid 114 may be an on/off type solenoid that is controlled with a pulse width modulated (PWM) control signal, such as a pulse width modulated (PWM) closed loop current drive or a pulse width modulated (PWM) voltage drive. As shown, the solenoid 114 includes a coil portion, such as encapsulated coil portion 116, that is energizable to act on a pole portion 120 and an armature portion 122. The third land 76 of the spool 70 may form the armature portion 122. Alternately, although not specifically shown, the spool 70 may not include the armature portion and an additional member may be disposed between the spool 70 and the solenoid 114, the additional member serving as the armature portion, for example.

The solenoid 114 may also include a first sealing element, such as a sealing ring 124, disposed between the valve body 12 and the solenoid 114 for sealing the chamber portion 104. A coil plate 126 and a second sealing element, such as a sealing ring 130 are disposed at an end of the solenoid 114 proximate the second valve end 24 for maintaining placement of the coil portion 116 and pole portion 120 in the valve body 12. The sealing rings 124 and 130 may be made of nylon, rubber, or any other suitable material. As shown, the valve body 12 may be swaged over (or otherwise coupled to) a portion of the coil plate 126, thus maintaining further placement of the coil portion 116 and pole portion 120. Precise placement of the pole portion 120 allows for control of tolerancing of the valve 10 with respect to movement of the spool 70 within the valve bore 14 between the first and second positions of the spool 70. Additionally, a rubber boot 132 may be coupled over the solenoid 114 and may be coupled to or otherwise engage with the valve body 12 to assist in preventing exposure of the solenoid 114 to an external environment.

Because the solenoid 114 may be an on/off type solenoid, the solenoid 114 may be operable to move the armature portion 122, and thus also the spool 70, between the first and second positions of the spool 70. Particularly, the solenoid 114 may be operable to move the spool 70 towards the second end 24 of the valve body 12 to the first position, as shown in FIG. 1B. When the solenoid 114 is in an on position and is actuated, the spool 70 is moved to the first position and the valve 10 is open. On the other hand, the spring 106 acts to bias the spool 70 towards the first valve end 20 within the valve bore 14 to the second position, as shown in FIG. 1C. When the solenoid 114 is in an off position and is not actuated, the spool 70 is thus moved to the second position and the valve 10 is closed.

When the valve 10 is coupled to a hydraulic system, control pressure is supplied to the control pressure port 32, supply pressure is supplied to supply pressure port 46, and tank pressure is supplied to the tank pressure port 64. The control pressure enters the valve bore 14 via the control port 32 and the flow passage 40. The supply pressure enters the valve bore 14 via supply port 46, flow passages 50 and 52, and second recess 30. Tank pressure enters the interior chamber 94 of the spool 70, the spring chamber 100, and the chamber portion 104 via the tank pressure port 64.

To operate the valve 10 when it is coupled to a hydraulic system, the actuator, such as the solenoid 114, is cycled between on and off positions, and may be cycled numerous times per second. As stated, when the actuator, such as the solenoid 114, is in the off position, the spool 70 is biased towards the first end 20 of the valve body 12, and moves into the second position, as shown in FIG. 1C. It should be noted that the second position of the spool 70 in one instance may differ with reference to the exact position of the spool 70 in the second position in a prior or subsequent instance. In the second position, the first spool end 80 generally abuts the tank pressure port coupling 66. Thus, a gap 133 is formed at the chamber portion 104 between the second spool end 82 and a first end 134 of the pole portion 120 of the solenoid 114, as shown in FIG. 1C. It should also be noted that one of ordinary skill will realize that the spool 70 and the tank pressure port coupling 66 may not be in contact and may instead by generally adjacent one another.

At the second position, the valve 10 is closed because there is generally restricted fluidic communication between the supply pressure port 46, serving as an inlet port, and the control pressure port 32, serving as an outlet port. More particularly, the first recessed portion 84 is generally not in fluidic communication with the supply pressure port 46. An overlap 136 is formed between the second land 74 and a sidewall 138 of the valve bore 14 due to the movement of the spool 70 to the second position. Accordingly, at the second position, the second land 74 generally restricts fluidic communication between the second recess 30 and the valve bore 14 by generally covering the second recess 30.

Instead, at the second position, fluidic communication is generally allowed between the control pressure port 32 and the tank pressure port 64. More particularly, fluid flows from the control pressure port 32 into the first recessed portion 84. Fluid flow continues from the first recessed portion 84 to the first recess 26 via a gap 140 formed between the first land 72 and the sidewall 138 of the bore 14, the gap 140 formed due to the movement of the spool 70 to the second position. The fluidic communication is allowed because, at the second position, the first land 72 generally does not fully cover the first recess 26, and thus permits the fluidic communication between the first recessed portion 84 and the first recess 26 via the gap 140. Fluid flow continues from the first recess 26 and to the tank pressure port 64 via the plurality of flow passages 92 disposed in the first land 72. Additionally, the interior chamber 94 of the spool 70, the spring chamber 100, and the chamber portion 104 are all at tank pressure via fluidic communication with the tank pressure port 64.

When the actuator, such as the solenoid 114, is in the on position, the spool 70 is moved towards the second end 24 of the valve body 12 and enters the first position, as shown in FIG. 1B. It should be noted that the first position of the spool 70 in one instance may differ with reference to the exact position of the spool 70 in the first position in a prior or subsequent instance. When the spool 70 is in the first position, the second spool end 82 generally abuts the first end 134 of the pole portion 120 of the solenoid 114. Thus, a gap 142 is formed between the first spool end 80 and the tank pressure port coupling 66, as shown in FIG. 1B. It should also be noted that one of ordinary skill will realize that the spool 70 and the pole portion 120 may not be in contact and may instead by generally adjacent one another.

At the first position, the valve 10 is open because fluidic communication is generally permitted between the supply pressure port 46, serving as an inlet port, and the control pressure port 32, serving as an outlet port. More particularly, the first recessed portion 84 is generally in fluidic communication with each of the supply pressure port 46 and the control pressure port 32. A gap 144 is formed between the second land 74 and the sidewall 138 of the bore 14 due to the movement of the spool 70 to the first position. The gap 144 generally permits the fluidic communication between the supply pressure port 46 and the first recessed portion 84. Accordingly, at the first position, the overlap 136 that is formed at the second position is generally eliminated. The second land 74 generally does not fully cover the second recess 30 and thus generally permits fluidic communication between the second recess 30 and the valve bore 14. Fluid flows from the supply pressure port 46, through the flow passages 54 and 56, and into the second recess 30, continues into the first recessed portion 84 via the gap 144, through the flow passage 40, and exits the valve body 12 via the control pressure port 32.

Further, at the first position fluidic communication is generally restricted between the control pressure port 32 and the tank pressure port 64. More particularly, fluid generally does not flow from the control pressure port 32 into the first recessed portion 84 and then into the first recess 26. An overlap 146 is formed between the first land 74 and the sidewall 138 of the bore 14 due to the movement of the spool 70 to the first position. Accordingly, at the first position, the gap 140 that is formed at the second position is generally closed. The first recess 26 is generally covered by the first land 72, thereby generally restricting fluidic communication between the first recess 26 and the first recessed portion 84. Additionally, the interior chamber 94 of the spool 70, the spring chamber 100, and the chamber portion 104 all remain at tank pressure via fluidic communication with the tank pressure port 64.

In the event that the spring 106 fails, such as by breaking or weakening, a sufficient force does not act upon the spool 70 to bias or to move the spool 70 towards the first end 20 of the valve body 12 and into the second position. The spool 70 may remain biased towards the second end 24 of the valve body 12 in the first position via the tank pressure acting on the interior chamber 94. Upon movement of the spool 70 to the first position via actuation of the solenoid 114, the valve 10, and specifically the gap 144, may remain open without a force capable of again biasing or moving the spool 70 towards the first end 20 of the valve body 12 into the second position, and thereby closing the valve 10, and specifically closing the gap 144. Accordingly, a fast acting switchable hydraulic valve which moves to the second position in an event of such a failure is desirable.

Figure 2A:
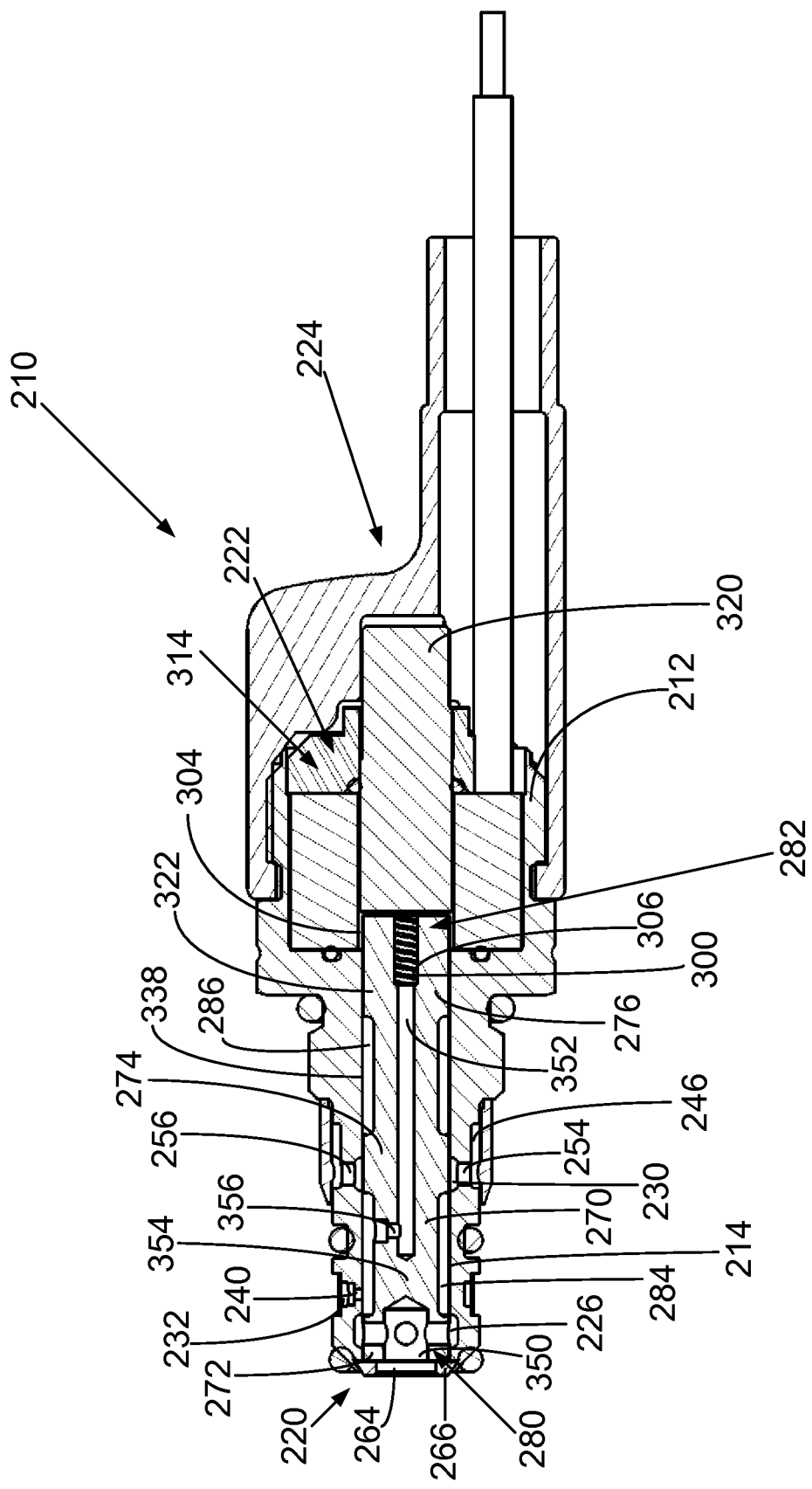
FIG. 2A is a partial cut-away view of an exemplary fast switching hydraulic pilot valve.
Figure 2B:
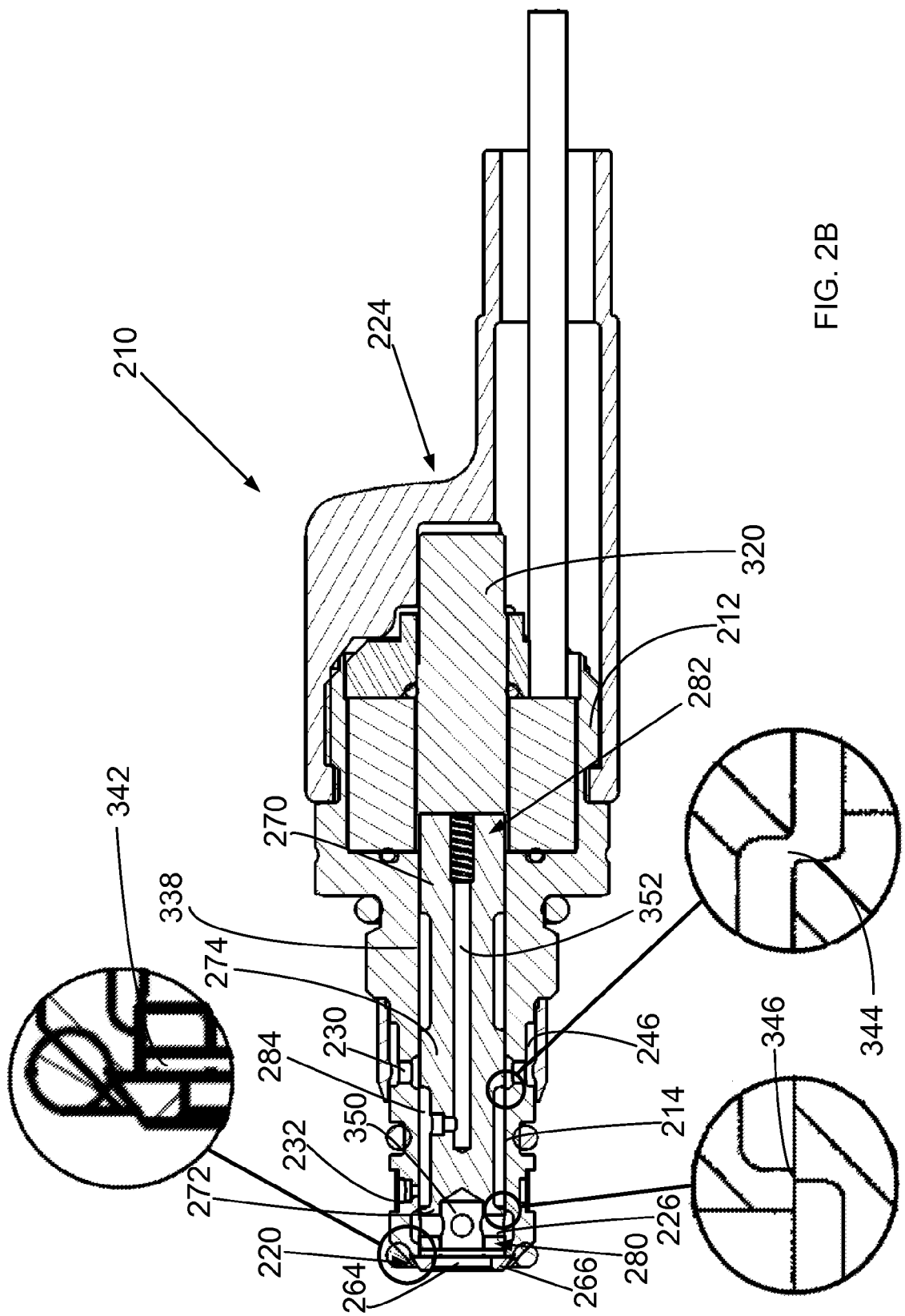
FIG. 2B is another partial cut-away view of the exemplary fast switching hydraulic pilot valve of FIG. 2A.
Figure 2C:
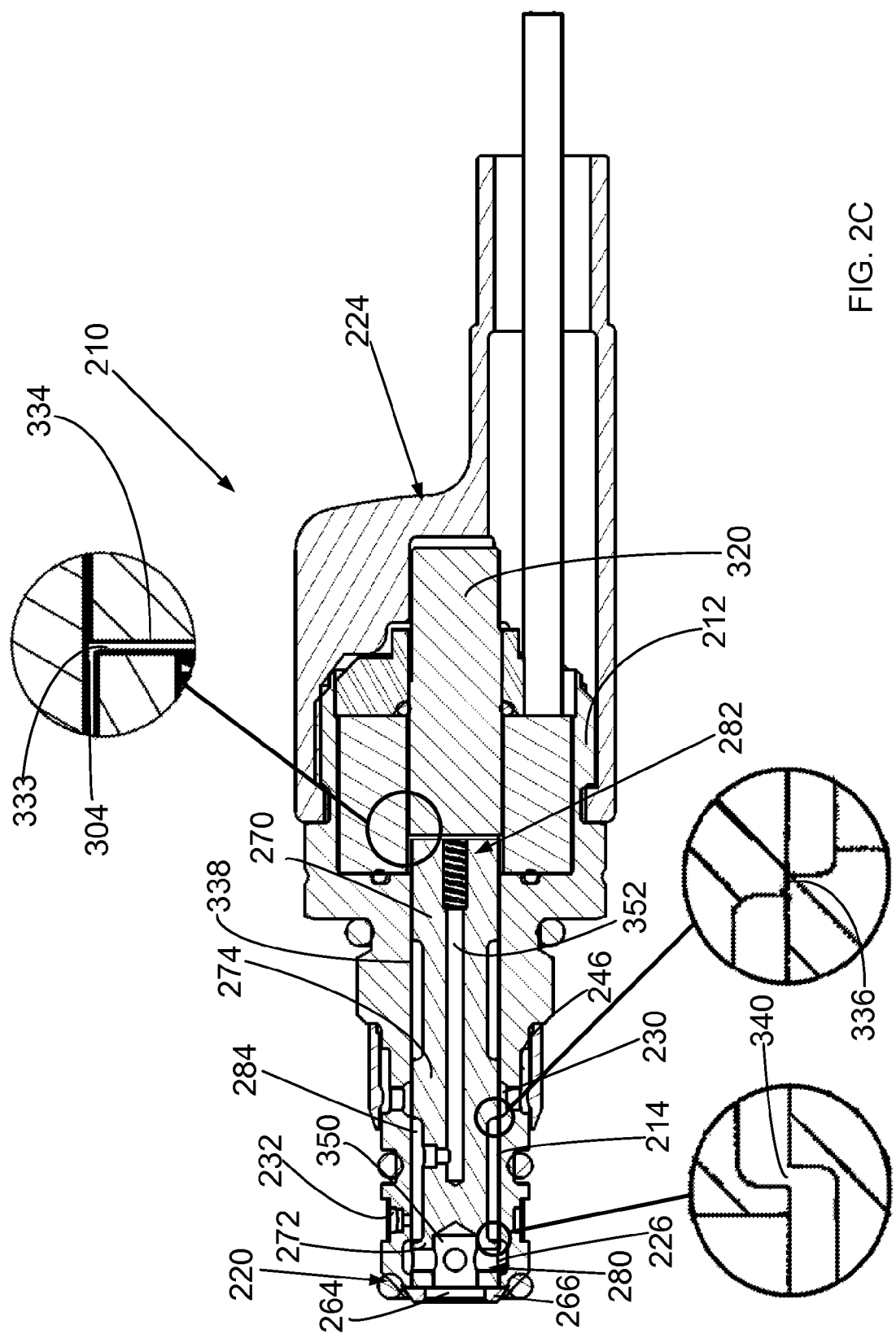
FIG. 2C is yet another partial cut-away view of the exemplary fast switching hydraulic pilot valve of FIG. 2A.

Referring now in detail to the drawings and initially to FIGS. 2A-2C, an exemplary hydraulic valve, such as a fast switching hydraulic pilot valve, is indicated generally at reference numeral 210. The valve 210 is generally similar to the above-referenced prior art valve 10, and consequently the same reference numerals but indexed by 200 are used to denote structures of the valve 210 corresponding to similar structures of the valve 10. In addition, the foregoing description of the valve 10 is equally applicable to the valve 210 except as noted below.

The valve 210 includes a valve body 212, a valve bore 214 disposed in the valve body 212, and a spool 270 received into the valve bore 214. The valve 210 also includes an actuator 222, such as a solenoid 314, disposed at a second valve end 224 of the valve body 212 for moving the spool 270 between first and second positions of the spool 270 thereby controlling fluidic communication between the valve bore 214 and the control pressure port 232, supply pressure port 246, and tank pressure port 264.

The spool 270 includes a first chamber, or first cavity portion 350, and second chamber, or second cavity portion 352. The first and second cavity portions 350 and 352 are fluidically separated within the spool 270 via an internal wall portion 354. The wall portion 354 may be part of a body of the spool 270 or may instead be a plug inserted into a single interior chamber, thereby fluidically separating the single interior chamber into the first and second cavity portions 350 and 352.

The first cavity portion 350 is disposed at the first spool end 280 and is in continuous fluidic communication with the tank pressure port 264 whether the spool is in the first or second position, wherein continuous fluidic communication may include fluidic communication that is generally continuous but not perfectly continuous. The second cavity portion 352 is disposed at the second spool end 282 and is in fluidic communication with the chamber portion 304 disposed between the spool 270 and a first end 334 of the pole portion 320 of the solenoid 314. The second cavity portion is also in continuous fluidic communication with the first recessed portion 284 via a spool port, such as a flow passage 356, disposed between the second cavity portion 352 and the first recessed portion 284, wherein continuous fluidic communication may include fluidic communication that is generally continuous but not perfectly continuous. Whether the spool 270 is in the first or second position, the first recessed portion 284 remains in fluidic communication with the control pressure port 232, thus maintaining the second cavity portion 352 and associated chamber portion 304 at the control pressure of the control pressure port 232.

Because the solenoid 314 may be an on/off type solenoid, the solenoid 314 may be operable to move the armature portion 322 (also the third land 276), and thus also the spool 270, between the first and second positions. Particularly, the solenoid 314 may be operable to move the spool 270 towards the second end 224 of the valve body 212 to the first position, as shown in FIG. 2B. When the solenoid 314 is in the on position and is actuated, the spool 270 is moved to the first position and the valve 210 is open. On the other hand, the control pressure at the chamber portion 304 acts on the second spool end 282 to bias the spool 270 towards the first valve end 220 within the valve bore 214 to the second position, as shown in FIG. 2C. When the solenoid 314 is in the off position and is not actuated, the spool 270 is thus moved to the second position and the valve 210 is closed.

When the valve 210 is coupled to a hydraulic system, control pressure is supplied to the control pressure port 232, supply pressure is supplied to supply pressure port 246, and tank pressure is supplied to the tank pressure port 264. The control pressure enters the valve bore 214 via the control port 232 and the flow passage 240, and continues into the second cavity portion 352, spring chamber 300, and chamber portion 304. The supply pressure enters the valve bore 214 via the supply port 246, flow passages 254 and 256, and second recess 230. Tank pressure enters the first cavity portion 350 of the spool 270 via the tank pressure port 264.

To operate the valve 210 when it is coupled to a hydraulic system, the actuator, such as the solenoid 314, is cycled between on and off positions, and may be cycled numerous times per second. Particularly, the solenoid 314 may be controlled with a pulse width modulated (PWM) control signal, such as a pulse width modulated (PWM) closed loop current drive or a pulse width modulated (PWM) voltage drive. When the actuator, such as the solenoid 314, is in the off position, the spool 270 is biased towards the first end 220 of the valve body 212, and moves into the second position, as shown in FIG. 2B. It should be noted that the second position of the spool 270 in one instance may differ with reference to the exact position of the spool 270 in the second position in a prior or subsequent instance. In the second position, the first spool end 280 generally abuts the tank pressure port coupling 266. Thus, a gap 333 is formed at the chamber portion 304 between the second spool end 282 and a first end 334 of the pole portion 320 of the solenoid 314, as shown in FIG. 2B. It should also be noted that one of ordinary skill will realize that the spool 270 and the tank pressure port coupling 266 may not be in contact and may instead by generally adjacent one another.

At the second position, the valve 210 is closed because there is generally restricted fluidic communication between the supply pressure port 246, serving as an inlet port, and the control pressure port 232, serving as an outlet port. More particularly, the first recessed portion 284 is generally not in fluidic communication with the supply pressure port 246. An overlap 336 is formed between the second land 74 and a sidewall 338 of the valve bore 214 due to the movement of the spool 270 to the second position. Accordingly, at the second position, the second land 274 generally restricts fluidic communication between the second recess 230 and the valve bore 214 by generally covering the second recess 230.

Instead, at the second position fluidic communication is generally allowed between the control pressure port 232 and the tank pressure port 264. More particularly, fluid flows from the control pressure port 232 into the first recessed portion 284. Fluid flow continues from the first recessed portion 284 to the first recess 226 via a gap 340 formed between the first land 272 and the sidewall 338 of the bore 214, the gap 340 formed due to the movement of the spool 270 to the second position. The fluidic communication is allowed because, at the second position, the first land 272 generally does not fully cover the first recess 226, thus permitting fluidic communication between the first recessed portion 284 and the first recess 226 via the gap 340. Fluid flow continues from the first recess 226 and to the tank pressure port 264 via the plurality of flow passages 292 disposed in the first land 272. Additionally, the second cavity portion 352 of the spool 270, the spring chamber 300, and the chamber portion 304 are all at lower pressure of the control pressure port 232, as a portion of the control pressure returns to the tank port 264 via fluidic communication of the control pressure port 232 with the first recessed portion 284. The lower pressure at the chamber portion 304 permits the solenoid 314 to subsequently move the spool 270 to the first position when the solenoid 314 is actuated or switched to an on position.

When the solenoid 114 is in the on position, the spool 270 is moved towards the second end 224 of the valve body 212 and enters the first position, as shown in FIG. 2C. It should be noted that the first position of the spool 270 in one instance may differ with reference to the exact position of the spool 270 in the first position in a prior or subsequent instance. When the spool 270 is in the first position, the second spool end 282 generally abuts the first end 334 of the pole portion 320 of the solenoid 314. Thus, a gap 342 is formed between the first spool end 280 and the tank pressure port coupling 266, as shown in FIG. 2C. It should also be noted that one of ordinary skill will realize that the spool 270 and the pole portion 320 may not be in contact and may instead by generally adjacent one another.

At the first position, the valve 210 is open because fluidic communication is generally permitted between the supply pressure port 246, serving as an inlet port, and the control pressure port 232, serving as an outlet port. More particularly, the first recessed portion 284 is generally in fluidic communication with each of the supply pressure port 246 and the control pressure port 232. A gap 344 is formed between the second land 274 and the sidewall 338 of the bore 214 due to the movement of the spool 270 to the first position. The gap 344 generally permits the fluidic communication between the supply pressure port 246 and the first recessed portion 284. Accordingly, at the first position, the overlap 336 that is formed at the second position is generally eliminated. The second land 274 generally does not fully cover the second recess 230 and thus generally permits fluidic communication between the second recess 230 and the valve bore 214. Fluid flows from the supply pressure port 246, through the flow passages 254 and 256, and into the second recess 230, continues into the first recessed portion 284 via the gap 344, through the flow passage 240, and exits the valve body 212 via the control pressure port 232.

Further, at the first position fluidic communication is generally restricted between the control pressure port 232 and the tank pressure port 264. More particularly, fluid generally does not flow from the control pressure port 232 into the first recessed portion 284 and then into the first recess 226. An overlap 346 is formed between the first land 274 and the sidewall 338 of the bore 214 due to the movement of the spool 270 to the first position. Accordingly, at the first position, the gap 340 that is formed at the second position is generally closed. The first recess 226 is generally covered by the first land 272, thereby generally restricting fluidic communication between the first recess 226 and the first recessed portion 284. Additionally, tank pressure at the tank port 264 acts upon the first cavity portion 350 of the spool 270.

Accordingly, because fluidic communication of the control pressure port 232 with the tank port 264 is generally restricted when the spool 270 is in the first position (FIG. 2B), specifically via the overlap 346, control pressure at the control pressure port 232 and at the chamber portion 304 is permitted to increase. Generally prior to the point at which pressure at the chamber portion 304 increases to a level capable of overcoming a combination of the forces of the solenoid 314 and of tank pressure acting upon the first cavity portion 350, the solenoid 314 is switched to the off position. The spool 270 is thus moved to the second position (FIG. 2C) via a pressure differential acting across the spool 270 between the first and second spool cavity portions 350 and 352. Once again, fluid communication between the tank port 262 and the control pressure port 232 is generally permitted, specifically via the gap 340, and the pressure at the chamber portion 304 is permitted to lower as a portion of the pressure at the control pressure port 232 again returns to the tank port 264. The above-described cycle is continued as the solenoid 314 is cycled or switched between on and off positions.

As will thus be realized by one of ordinary skill in the art, the valve 210 is not dependent upon the spring 306 to bias the spool 270 towards the second position. This is because the valve 210 relies on hydraulic feedback via control pressure at the chamber portion 304 to bias the spool 270 towards the second position. One of ordinary skill will realize, however, that the spring 306 may assist in biasing the spool 270 towards the second position if the valve 210 is aligned generally vertically. With the first valve end 220 aligned vertically above the second valve end 224, such as with the first cavity portion 350 aligned vertically above the second cavity portion 352, the spring 306 may assist in biasing the spool 270 towards a second position in the positive, or upwards, vertical direction to counter gravity acting upon the spool 270. Nonetheless, in a vertical alignment, it will be realized that the valve 210 may function without a spring 306 when a pressure at the chamber portion 304 is greater than the combination of the weight of the spool 270 and the tank pressure acting on the first cavity portion 350.

Figure 3:
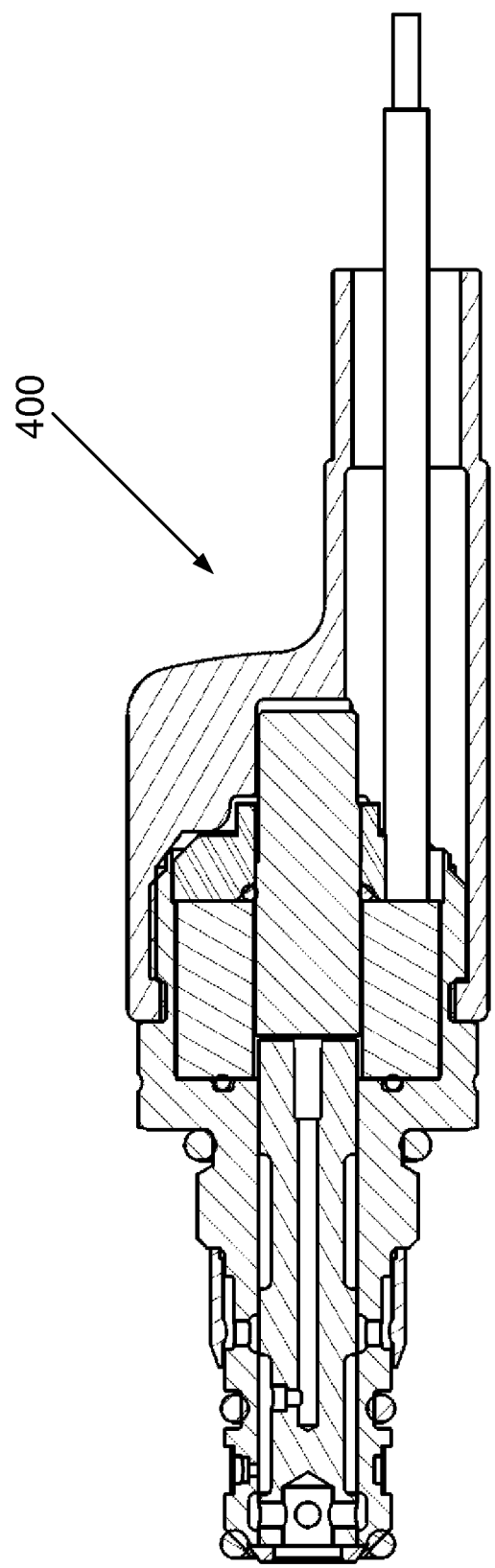
FIG. 3 is a partial cut-away view of another exemplary fast switching hydraulic pilot valve.

Accordingly, an exemplary valve may not include a spring, as shown in FIG. 3, whereby another exemplary valve is generally shown at 400 without a spring. The valve 400 is generally similar to the above-referenced exemplary valve 210, and consequently, the foregoing description of the valve 210 is equally applicable to the valve 400 except that the valve 400 does not include a spring.

Figure 4:
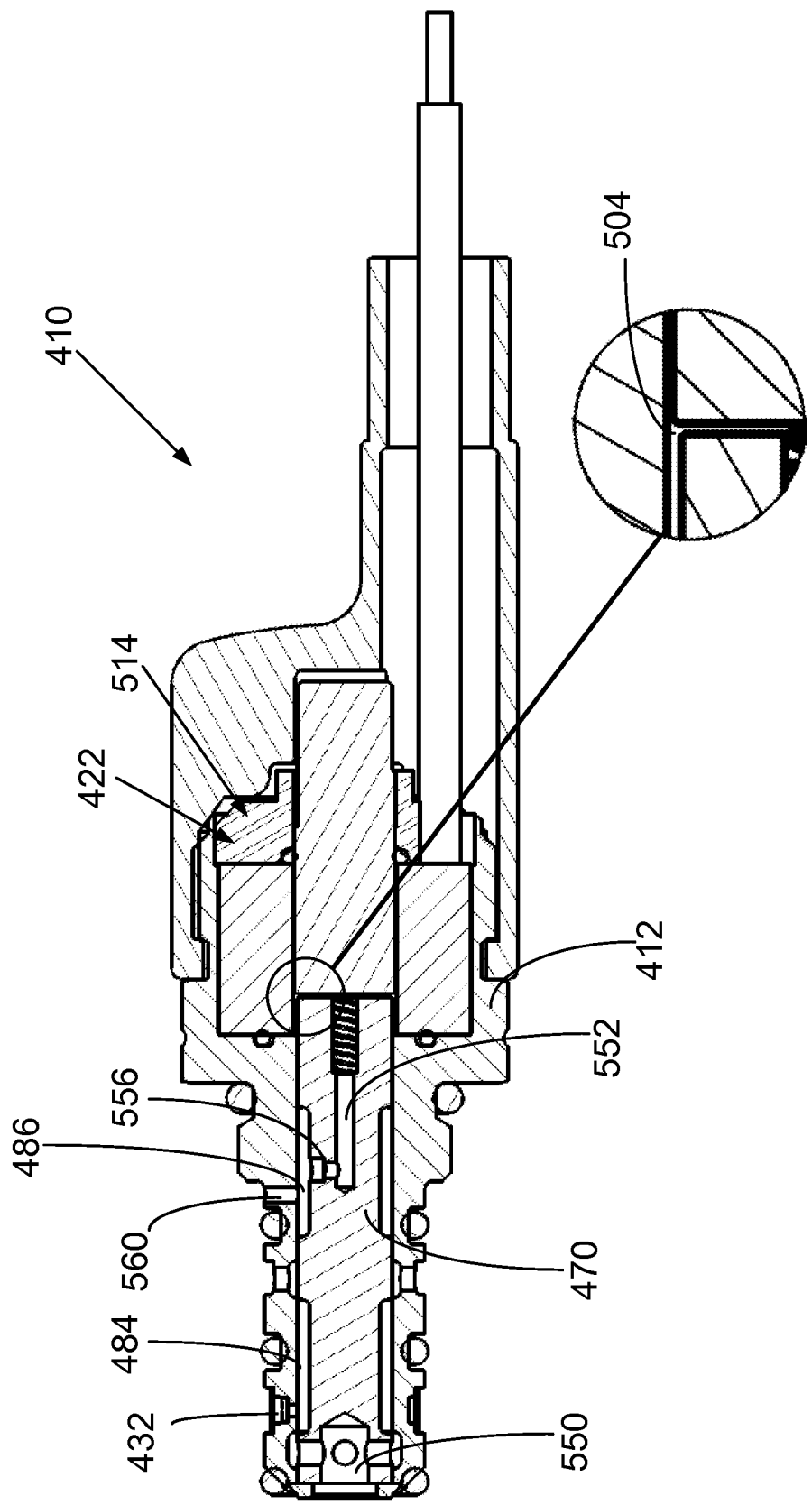
FIG. 4 is a partial cut-away view of yet another exemplary fast switching hydraulic pilot valve.

Turning now to FIG. 4, an exemplary hydraulic valve, such as a fast switching hydraulic pilot valve, is indicated generally at reference numeral 410. The valve 410 is generally similar to the above-referenced exemplary valve 210, and consequently the same reference numerals but indexed by 200 are used to denote structures of the valve 410 corresponding to similar structures of the valve 210. In addition, the foregoing description of the valve 210 is equally applicable to the valve 410 except as noted below.

The valve 410 includes first and second cavity portions 550 and 552 of the spool 470. The second cavity portion 552 is in fluidic communication with second recessed portion 486, rather than with the first recessed portion, as shown in FIGS. 2A-2C. The second recessed portion 486 is in continuous fluidic communication with a supplemental port 560 of the valve body 412 regardless of whether the spool 470 is in the first or second position, wherein continuous fluidic communication may include fluidic communication that is generally continuous but not perfectly continuous. The supplemental port 560 extends through the valve body 412 and terminates at the valve bore 414.

When the valve 410 is coupled to a hydraulic system, the supplemental port 560 is coupled to a supplemental apparatus (not shown) such as a piston-cylinder assembly, pilot valve, or other suitable apparatus for controlling a pressure of the chamber portion 504. The supplemental apparatus may in turn be communicatively coupled to the actuator 422, such as a solenoid 514. The communicative coupling may allow coordination of an increase of pressure to the chamber portion 504 generally prior to switching the solenoid 514 to the off position and also coordination of a decrease of pressure to the chamber portion 504 generally prior to switching the solenoid to the on position.

In comparison to the valve 210 of FIGS. 2A-2C, the valve 410 of FIG. 4 relies on hydraulic feedback from the supplemental apparatus rather than hydraulic feedback from the control pressure port 432 to move the spool 470 to the second position. Accordingly, similar to the valve 210 of FIGS. 2A-2C, the valve 410 of FIG. 4 also relies on a pressure differential acting across the spool 470 between the first and second cavity portions 550 and 552 to bias and to move the spool 470 to the second position.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic valve comprising:
a valve body defining an inner valve bore and a plurality of valve ports in selective fluidic communication with the valve bore;
a spool received in the valve bore and moveable between first and second positions for controlling fluidic communication between the valve bore and the plurality of valve ports;
an actuator configured to move the spool to the first position within the valve body when the actuator is actuated, wherein the first position allows fluidic communication between a first valve port of the plurality of valve ports and a second valve port of the plurality of valve ports while restricting fluidic communication between the first valve port and a third valve port of the plurality of valve ports; and
a chamber disposed at an end of the spool proximate the actuator, a pressure of the chamber causing bias of the spool in a direction of the second position, wherein the second position of the spool restricts fluidic communication between the first and second valve ports while allowing fluidic communication between the first and third valve ports,
wherein the spool includes a spool body defining a spool bore, the spool bore including first and second cavity portions, the second cavity portion for establishing fluidic communication with a control pressure of the first valve port and a tank pressure of the third valve port.

2. The hydraulic valve of claim 1, wherein the chamber is in continuous fluidic communication with the first valve port, thereby biasing the spool in a direction of the second position when exposed to a control pressure at the first valve port.

3. The hydraulic valve of claim 1, wherein the spool includes a spool body defining a spool bore, the spool bore defining a first cavity portion disposed at the end of the spool proximate the actuator, the first cavity portion in continuous fluidic communication with the chamber and with the first valve port.

4. The hydraulic valve of claim 1, wherein the spool includes a spool port extending through the spool body, the spool port providing for the continuous fluidic communication between the first cavity portion and the first valve port.

5. The hydraulic valve of claim 1, wherein the first cavity portion is in continuous fluidic communication with the chamber, the first cavity portion for establishing fluidic communication with a control pressure of the first valve port, a supply pressure of a second valve port, and a tank pressure of the third valve port.

6. The hydraulic valve of claim 1, wherein the spool is biased in a direction of the second position when exposed to a pressure differential acting across the spool between the first and second cavity portions.

7. The hydraulic valve of claim 1, further comprising a flow path disposed in the valve body, the flow path for establishing fluidic communication with the chamber, and the flow path fluidically separated from the first, second, and third valve ports.

8. The hydraulic valve of claim 1, further comprising a spring for biasing the spool in a direction of the second position.

9. The hydraulic valve of claim 8, wherein a failure of the spring does not cause the spool to be biased in a direction of the first position.

10. The hydraulic valve of claim 1, wherein the actuator is a solenoid.

11. The hydraulic valve of claim 10, wherein the solenoid is controlled via a pulse width modulated (PWM) closed loop current drive or a pulse width modulated (PWM) voltage drive.

12. A hydraulic valve comprising:
an actuator;
a valve body including a valve bore and a plurality of pressure ports extending through the valve body to the valve bore; and
a spool receivable in the valve bore and moveable between first and second positions, the first position permitting communication between a supply pressure port of the plurality of pressure ports and a control pressure port of the plurality of pressure ports, the second position restricting communication between the supply pressure port and the control pressure port;
the spool including an interior passageway for defining first and second chambers, the first chamber for establishing continuous communication with a tank pressure port of the plurality of pressure ports, and the second chamber for establishing continuous communication between the control pressure port and a third chamber, the third chamber disposed between the actuator and an end of the spool opposite the first chamber;
wherein actuation of the actuator causes the spool to move in a direction of the first position; and
wherein exposure of the third chamber to a control pressure at the control pressure port causes the spool to be biased in a direction of the second position.

13. The hydraulic valve of claim 12, wherein the first position of the spool restricts communication between the control pressure port and the tank pressure port, and wherein the second position of the spool allows communication between the control pressure port and the tank pressure port.

14. The hydraulic valve of claim 12, further comprising a spring disposed between the actuator and the end of the spool opposite the first chamber, the spring for biasing the spool in a direction of the second position.

15. The hydraulic valve of claim 14, wherein a failure of the spring does not cause the spool to be biased in a direction of the first position.

16. The hydraulic valve of claim 12, wherein a pressure differential acting across the spool between the first and second chambers causes the spool to be biased in a direction of the second position.

17. The hydraulic valve of claim 12, wherein the actuator is a solenoid, and the solenoid is controlled via a pulse width modulated (PWM) closed loop current drive or a pulse width modulated (PWM) voltage drive.

18. The hydraulic valve of claim 14, wherein the spring maintains bias of the spool in a direction of the second position upon vertical alignment of the hydraulic valve between the first and second chambers.

19. A hydraulic valve comprising:
a valve body defining a valve bore extending therein between a first valve end and a second valve end opposite the first valve end, the valve body further defining a plurality of valve ports extending through the valve body and in fluidic communication with the valve bore, wherein a first valve port of the plurality of valve ports is disposed at the first valve end;
a spool received within and moveable within the valve bore, the spool including a spool body defining first and second spool cavities, the first spool cavity extending therein between a first spool end and an internal wall portion of the spool body, and the second spool cavity extending therein between the internal wall portion and a second spool end opposite the first spool end, wherein the first spool cavity is in continuous fluidic communication with the first valve port, and wherein the second spool cavity is in continuous fluidic communication with one of the second or third valve ports; and an actuator disposed proximate a portion of the second spool end of the spool, the actuator for moving the spool within the valve bore thereby controlling fluidic communication amongst the first, second, and third valve ports of the plurality of valve ports when the actuator is actuated;

wherein fluidic communication amongst the first, second, and third valve ports when the actuator is not actuated is controlled by a pressure differential acting across the spool between the first and second spool cavities, the pressure differential caused by exposure of the first valve port to a first pressure and exposure of the one of the second or third valve ports to a second pressure greater than the first pressure.

* * * * *